United States Patent
Tsun et al.

(10) Patent No.: US 11,907,284 B2
(45) Date of Patent: Feb. 20, 2024

(54) METHOD AND A SYSTEM FOR PROCESSING AN IMAGE AND FOR GENERATING A CONTEXTUALLY COHERENT VIDEO BASED ON IMAGES PROCESSED THEREBY

(71) Applicant: Visuo Technology Pty Limited, Tuen Mun (HK)

(72) Inventors: Lap-Tin Tsun, Shatin (HK); Daniel Leau, Shatin (HK)

(*) Notice: Subject to any disclaimer, the term of this patent is extended or adjusted under 35 U.S.C. 154(b) by 189 days.

(21) Appl. No.: 17/283,979

(22) PCT Filed: Sep. 26, 2019

(86) PCT No.: PCT/CN2019/108313
§ 371 (c)(1),
(2) Date: Apr. 9, 2021

(87) PCT Pub. No.: WO2021/003853
PCT Pub. Date: Jan. 14, 2021

(65) Prior Publication Data
US 2022/0122268 A1 Apr. 21, 2022

(30) Foreign Application Priority Data
Jul. 9, 2019 (HK) .................. 19126522.2

(51) Int. Cl.
*G06T 7/194* (2017.01)
*G06F 16/58* (2019.01)
(Continued)

(52) U.S. Cl.
CPC .......... *G06F 16/58* (2019.01); *G06F 16/5846* (2019.01); *G06N 20/00* (2019.01);
(Continued)

(58) Field of Classification Search
CPC .... G06F 18/22; G06F 16/284; G06F 16/5854; G06V 20/10; G06V 10/75; G06V 10/17; G06V 2201/10
See application file for complete search history.

(56) References Cited

U.S. PATENT DOCUMENTS

2016/0042249 A1* 2/2016 Babenko ................ G06V 20/46
382/224
2018/0204083 A1* 7/2018 Goyal ..................... G06F 18/22
(Continued)

FOREIGN PATENT DOCUMENTS

| CN | 107392138 A | 11/2017 |
|---|---|---|
| CN | 109671137 A | 4/2019 |

OTHER PUBLICATIONS

International Search Report and Written Opinion; PCT/CN2019/108313; dated Apr. 15, 2010.
Search Report;China Intellectual; dated Feb. 19, 2020.

*Primary Examiner* — Congvan Tran
(74) *Attorney, Agent, or Firm* — Nevin Carmichael Consulting (NCC-IP)

(57) ABSTRACT

The invention provides a computer-implemented method of processing an image, the method comprising the steps of: identifying objects in the image using a content analysis engine; based on information from a relationship database, using a contextual analysis engine to automatically: identify contextual relationships between some or all of the identified objects in the image, derive a background or landscape of said image from one or more of said identified objects; and subsequently, and analyse the identified contextual relationships between the identified objects and the derived background or landscape to thereby associate one or more contexts with said image.

18 Claims, 5 Drawing Sheets

(51) Int. Cl.
*G06T 7/70* (2017.01)
*G06N 20/00* (2019.01)
*G06F 16/583* (2019.01)
*G06V 10/764* (2022.01)
*G06V 10/82* (2022.01)
*G06V 20/00* (2022.01)

(52) U.S. Cl.
CPC ............... *G06T 7/194* (2017.01); *G06T 7/70* (2017.01); *G06V 10/764* (2022.01); *G06V 10/82* (2022.01); *G06V 20/35* (2022.01)

(56) References Cited

U.S. PATENT DOCUMENTS

2019/0340817 A1* 11/2019 Bostick .............. G06F 3/04815
2019/0371145 A1* 12/2019 McQueen .......... H04L 63/1475

* cited by examiner

METHOD AND A SYSTEM FOR PROCESSING AN IMAGE AND FOR GENERATING A CONTEXTUALLY COHERENT VIDEO BASED ON IMAGES PROCESSED THEREBY

FIELD OF THE INVENTION

The invention relates to a computer-implemented method and system for processing one or more images, and particularly but not exclusively, for processing one or more images to identify contexts of the images. The invention further relates to a computer-implemented method and system for generating a contextually coherent video based on the images processed by the aforesaid image processing method and system.

BACKGROUND OF THE INVENTION

There exist computer programs or software for image and/or video recognition nowadays which utilize artificial intelligence (AI) such as natural language processing (NLP) as their core processing technology. Most of the NLP techniques are known to build upon traditional search engines and are operated based on text input to perform searching of information such as webpages, images and/or videos. Depending on the accuracy of the search terms, the NLP can be generally reliable for searching text-based data such as webpages and documents. However, the use of NLP in identifying or processing image and/or video data is known to present limitations as, in contrast to the searching of subject content, context of the searchable images and/or videos are generally less comprehensible and thus, difficult to be identified by the known computational techniques.

OBJECTS OF THE INVENTION

An object of the present invention is to provide a computer-implemented method and system for processing an image.

Another object of the present invention is to provide a computer-implemented method and system for generating a contextually coherent video based on a plurality of images processed by the aforesaid method and system.

A further object of the present invention is to mitigate or obviate to some degree one or more problems associated with known image-processing and/or video-generating methods and systems, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a computer-implemented method of processing an image. The method comprises the steps of: identifying objects in the image using a content analysis engine; based on information from a relationship database, using a contextual analysis engine to automatically: identify contextual relationships between some or all of the identified objects in the image, derive a background or landscape of said image from one or more of said identified objects; and subsequently, and analyze the identified contextual relationships between the identified objects and the derived background or landscape to thereby associate one or more contexts with said image.

In a second main aspect, the invention provides a computer-implemented method for generating a contextually coherent image sequence or video based on a plurality of images processed by the method of the first aspect. The method comprises the steps of: inputting one or more instructions; identifying one or more keywords associated with the inputted instructions; matching the keywords with metadata stored in association with images in an image database; retrieving a plurality of matched images from the matching step; and joining the plurality of matched images to form a contextually coherent image sequence or video.

In a third main aspect, the invention provides a non-transistory computer readable medium storing machine-readable instructions which, when implemented on a processor, implements the steps of the method of any one of the first and/or the second main aspects.

In a fourth main aspect, the invention provides a system comprising a memory for storing data and a processor for executing computer readable instructions, wherein the processor is configured by the computer readable instructions when being executed to implement the method of any one of the first and/or the second main aspects.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figure, may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
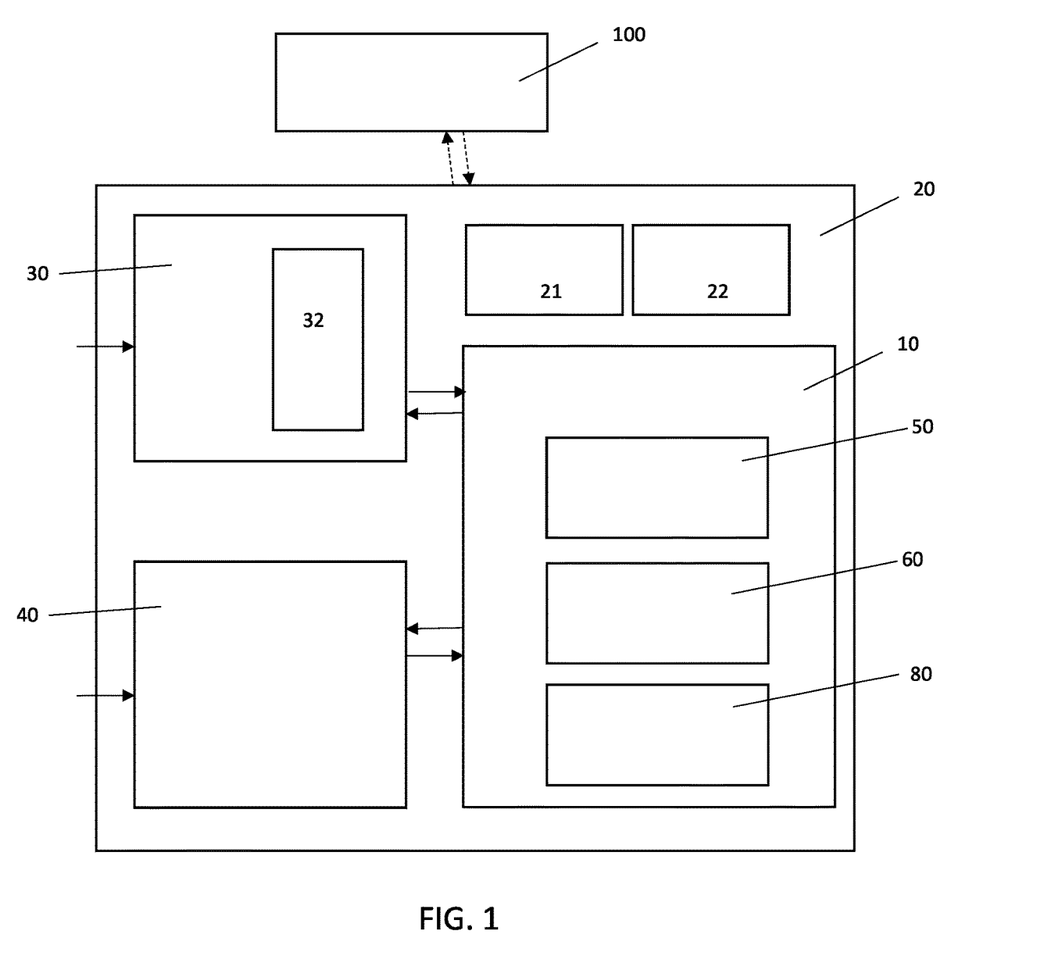
FIG. 1 is a block schematic diagram showing a computer system for processing an image according to the present invention.
Figure 2:
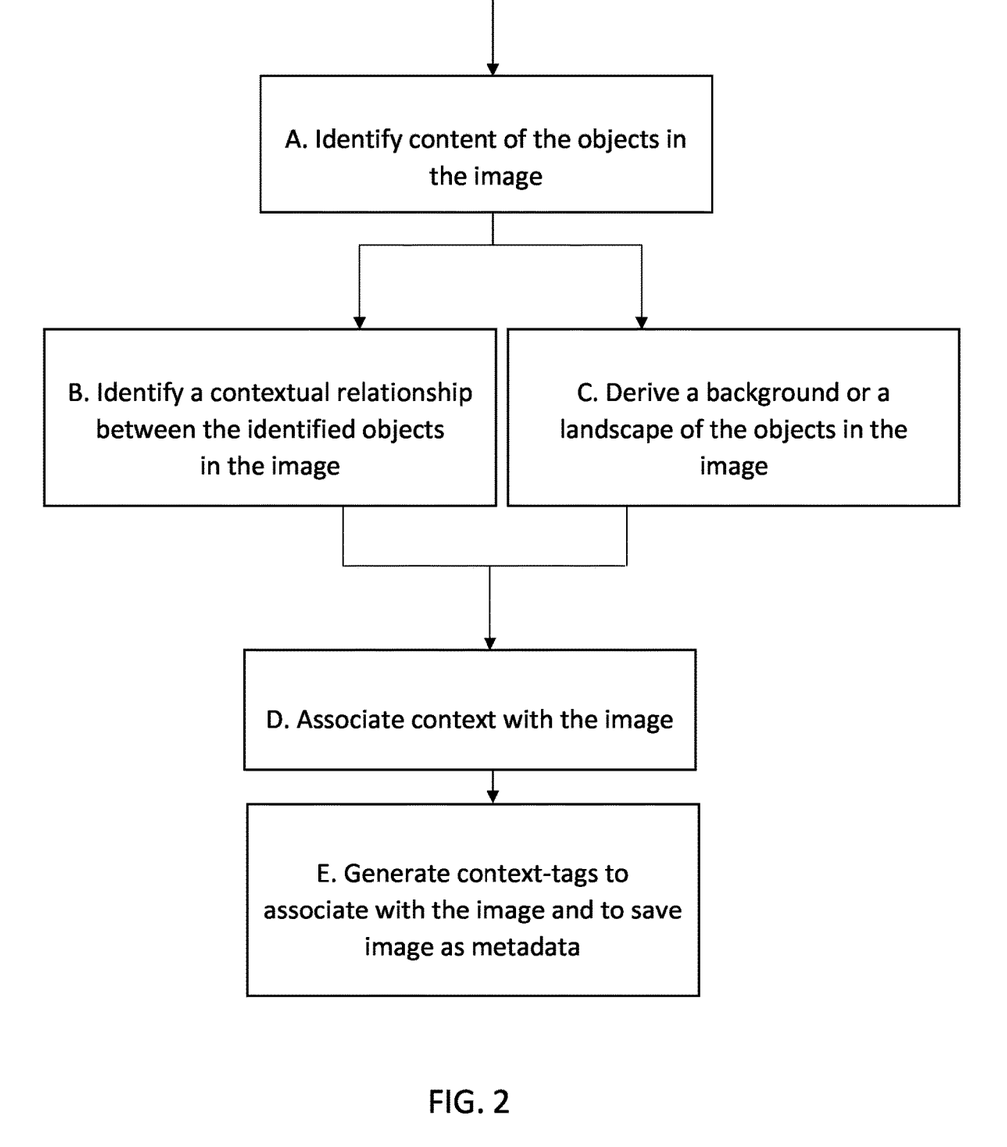
FIG. 2 is a flow diagram showing a computer-implemented method of processing an image implemented at the computer system of FIG. 1.

Referring to FIG. 1, shown is a block schematic diagram of a system 10 for processing an image, and particularly but not exclusively, for identifying one or more contexts of said image and/or associating the identified contexts with said image. FIG. 2 further shows the method steps for processing said image by the system 10. The method can be implemented in a computer device 20 in any known form including desk top computer, laptop computer, tablet computer, smart phone, or any portable electronic smart devices. Preferably, the computer device 20 is connectable or communicatable with a network 100, either in the form of a private network or a public network such as the internet, for exchanging information or data. The computer device 20 comprises a memory 21 for storing machine-readable instructions. The computer device 20 also includes a processor 22 which is configured to execute the machine-readable instructions to thereby implement the methods of the invention as more fully described below. The memory storing machine-readable instructions and the processor for executing said machine-readable instructions together embody the system 10 in the computer device 20. It will be understood that the computer device 20 may be one of a plurality of computer devices connected to the network 100 for implementing the methods of the invention. It will also be understood that the system 10 can be embodied in any suitable computer device 20 by downloading suitable software to said computer device 20.

The image processable by system 10 can be one or more images. The image may also be a moving image such as a video or a video clip. In one embodiment, the image may comprise a plurality of images adapted to be processed one by one, i.e. image by image in sequence by the system 10. If the image is a moving image, such as in the form of a video, for example, it can also be processed frame by frame by the system 10. In one further embodiment, it is preferred for the video be provided in the form of one or more short video clips each with a length of about 1 to 10 seconds, and more preferably, about 3-5 seconds. For example, each video clip may contain a single, discrete scene, with each scene related to a specific, self-contained topic. The images and/or videos processable by the system 10 can be manually added to and stored in an image database 30, as shown in FIG. 1, and more preferably, be manually inputted with descriptive tags to describe said images and/or video clips. The tags will then form part of metadata 32 for categorizing the images and/or videos stored in the image database 30. In the context of the present invention, the term "metadata" generally relates to one or more sets of data that describe and provide information about other data, which may comprise the images and/or videos as herein described. The metadata can be descriptive in nature, which may include titles or keywords either manually inputted by the user or automatically generated by the system.

The stored images and/or video clips in the image database 30 can be processed by the system 10 of the computer device 20 to identify contexts of said images and/or video clips. First, the images and/or video clips will be processed by a content analysis engine 50 of the system 10 to automatically identify one or more relevant objects, i.e. content of the objects from the image (i.e. Step A) as shown in FIG. 2. In one embodiment, the content analysis engine 50 may comprise or adopt one or more artificial intelligence-based, image recognition technologies such as but are not limited to a Convolutional Neutral Network (CNN). For example, the content recognition step can be performed by analyzing one or more characteristics of the objects which may include, but are not limited to, one or more of a pixel, a point, a line, and a surface of or related to the objects to thereby identify the objects in terms of their content in the image. For example, the content analysis engine 50 may identify the presence of a ball in an image via an analysis on the characteristics of, e.g. a round outline, and/or a rotational movement as shown in a video clip after a frame by frame analysis, etc. However, the content analysis engine 50 is not intended to derive context of the image such as, for example, why the ball is there, or how is it related to other objects in the image and/or to the background of the image. The function of the content analysis engine 50 is thus to automatically identify said object as likely to be "a ball" from the image only.

Preferably, after having the content of the image and/or video clip identified it may then automatically tagged with one or more content tags by the system 10, which may, again, be based on the CNN learning models or similar technologies. More preferably, the content tags can be stored as part of the metadata 32 against the image and/or video clip for the purpose of automatically categorizing the processed image/videos in the image database 30.

The content analysis engine 50 can be effective in automatically identifying objects in an image or video clip, but is much less reliable in understanding any contexts between identified objects. For example, the content analysis engine 50 may identify a first image as showing a man with a dog in a park and a second image as also showing a man with a dog in a park. However, typically content analysis engines are unable to distinguish contexts such as, in this example, where the first image actually shows a man playing with a dog in a park and the second image which shows a man standing next to a sleeping dog. The contextual difference between the first and second images is therefore one based on activity between the identified objects in the image which the content analysis engine cannot reliably determine.

After the content analysis step of Step A, the image and/or the video clip will further be processed by a contextual analysis engine 60 whereby one or more contexts of the image will be identified. The identified contexts will then be associated with the image processed. Preferably, analysis by the contextual analysis engine 60 can be based on information from a relationship database 40, which can be manually provided and maintained via manual information input, and/or automatically learnt or developed by one or more artificial intelligence-based, machine learning algorithms, such as but are not limited to, CNN learning models or similar technologies. In one embodiment, the contextual analysis engine 60 may automatically identify contextual relationships based on, for example, learnt relationships such as one or more of a natural relationship, an organic relationship and/or an explicit relation between some or all of the primary identified objects in the image from the content analysis step of Step A. For example, such as in Step B as shown in FIG. 2, the contextual analysis engine 60 may identify the natural relationships between the identified primary objects in the image such as, for example, by using a graph knowledge base of a graph theory node traversal process. However, in some embodiments, the identification of natural relationships among the primary objects may still be insufficient to provide a full understanding of the context of the image or video analyzed. To allow a more comprehensive derivation of the contexts of the image or video, the contextual analysis engine 60 may further identify one or more backgrounds and/or landscapes of said image for a more in-depth analysis of said image, as shown in Step C of FIG. 2. Particularly, the background and/or landscape of the image may comprise one or more secondary objects other than the primary objects previously identified in the image. For example, the primary objects can be provided at or viewed from a first visual layer of the image having a first distance from a view point of the user, i.e. at a first view depth of the image; and that the secondary objects constituting the background and/or landscape of said image can be provided at or viewed from a second visual layer of said image having a second distance from the view point of the user, i.e. at a second view depth of the image relative to the user. In one embodiment, the second distance or the second view depth is further than the first distance or the first view depth relative to the user's view point.

It will be appreciated that primary objects may be identified from a plurality of first or primary visual layers in an image or video clip and that secondary objects may be identified from a plurality of second or secondary visual layers in the image or video clip where the plurality of secondary visual layers are at deeper view depths than any of the plurality of primary visual layers.

The machine learning models of the contextual analysis engine 60 may then study the image in the various view depths with an aim to derive any possible contexts of the image based on, for example, the natural relationships between the various primary objects, and also the natural relationships between the various layers or depths of the primary and secondary objects of the image.

By analyzing the contextual relationship among the primary objects and also, the derived background and/or landscape of the secondary objects, the contextual analysis engine 60 is able to suggest possible, relevant contexts for the image and/or video analyzed, and to associate said contexts with the image and/or video, as shown in Step D of FIG. 2. For example, if having the primary objects of "a ball" and "a group of men" identified in an image by Step A, their contextual relationships identified by Step B; and separately, with the background relative to these primary objects such as "a green field" and "a goal structure" being derived by Step C, a possible context of the image which can be, for example, "a football match" can then be determined in a relatively more reliable manner. A different contextual relationship would likely result from a situation where the primary objects were identified as "a ball" and "a group of men" with the background relative to these primary objects being identified as a basketball hoop and basketball court. Consequently, a much more reliable contextual relationship for an image or a sequence of images can be obtained when the primary objects of the image and any contextual relationships between said primary objects are analysed in connection with secondary objects comprising or defining a background or landscape of the image or sequence of images.

The image and/or video with their contexts assessed and determined may then be associated with one or more of the corresponding context tags, with the image and/or video being stored in the image database 30 in association with the context tags as metadata 32 describing said contexts. For example, the image and/or video can be tagged with one or more context tags such as, for example, "a football match", "sports" and/or "energetic football players", etc. More preferably, the identified contextual relationships between the identified primary and/or between the primary and the secondary objects may also be stored in the relationship database 40 processable by the machine learning algorithm to form part of the growing or self-learning information in said database.

In one embodiment, the contextual analysis engine 60 may further recognize one or more texts or logos in the image and, based on the information from the relationship database 40, automatically identify contextual relationships between some or all of the identified objects and the recognized one or more texts or logos in the image to thereby derive the possible, relevant contexts of the image.

Figure 3:
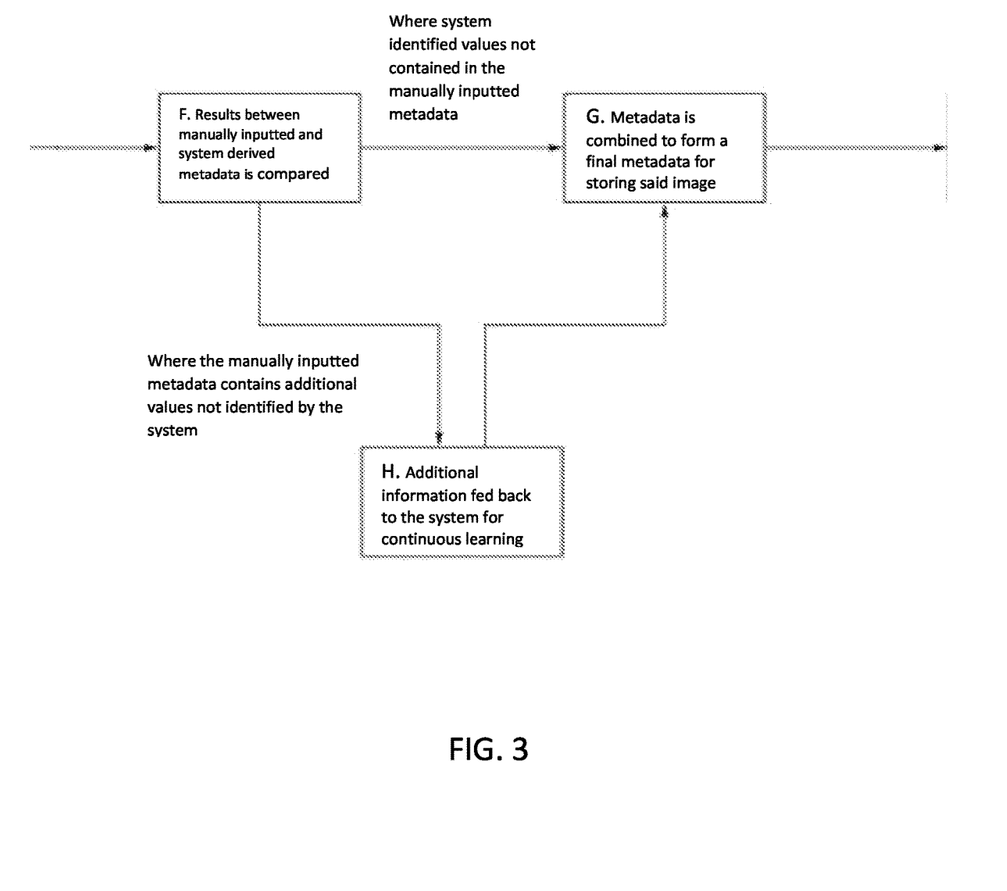
FIG. 3 is a flow diagram showing a computer-implemented method of comparing the metadata stored at the computer system of FIG. 1.

After the system-derived contexts of one image are derived, and that one or more context-tags are automatically generated to associate said image with the system-derived contexts for automatically categorizing and storing said image at the image database 30 under the corresponding metadata 32 (see Step E of FIG. 2), the system 10 may further compare, automatically, the system-derived context-associated metadata with the user-created, manually-inputted metadata describing said images (see Step F of FIG. 3). Particularly, the system 10 can be arranged to modify or edit the metadata for storing based on the difference identified by the comparing step. For example, if the system 10 identified contexts of an image which are not contained in the manually inputted metadata, the user inputted metadata and the system-derived metadata can be combined to form a final metadata for storing said image at the image database 30, as shown in Step G of FIG. 3. If, however, the manually inputted metadata may contain additional information which has not been identified by the system 10, the additional information can be fed back to the system 10 for continuous learning, see Step H of FIG. 3. The image with its metadata compared and revised can then be stored in the image database 30 and is ready for use by the system 10 for the subsequent matching and video formation steps.

In yet another aspect of the present invention, the system 10 may further comprise a video generating module 80 adapted to generate a contextually coherent sequence of images or video based on a plurality of images. Particularly, the plurality of images can be previously processed by the system 10 as described above, and stored in a content library or image database 30 under one or more manually inputted and/or system-derived metadata after the images are processed automatically for the purpose of contextual identification. As previously discussed, the images may comprise one or more moving images such as, for example, one or more short video clips processable frame by frame in sequence by the system 10.

The following description will refer to generation of a contextually coherent video, but it will be understood that the method may also be applied to form a contextually coherent sequence of images.

Figure 4:
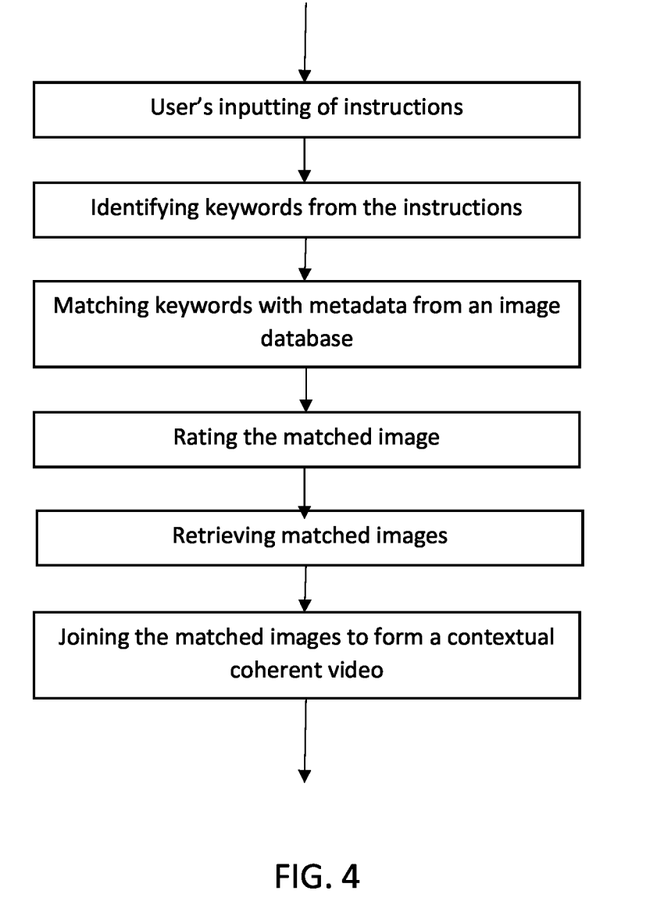
FIG. 4 is another flow diagram showing a computer-implemented method of generating a contextually coherent image sequence or video based on images processed by the method of FIG. 2.

As shown in FIG. 4, the method of generating the contextually coherent video by joining together a number of discrete video clips may first require the inputting of one or more instructions or some text or oral input from the user. The user's instructions can be text instructions which relate to the purpose, nature and/or function of the resulting, generated video. For example, the inputted instructions may comprise one or more text such as words, phrases, expressions, sentences and/or paragraphs relating to, e.g. the types of business and/or industry of the end video such as, for example, "marketing", "legal", "fashion", "electronic", etc. The text instructions may also relate to one or more objectives of the end video such as, for example, "branding", "education", and/or "product explainer", etc. The text instructions may further comprise one or more sets or sentences of scripts such as, for example, "We are XYZ company. We do online marketing campaigns for your business", etc. In a further embodiment, the system 10 may additionally or optionally be provided with one or more audio sensing modules for processing and/or recognizing voice instructions from the user. The user input may however simply comprise some text or audio input provided by a user which can be parsed for keywords. Furthermore, the user input may be automatically derived from a user source such as a user's website such that the user does not actively have to input any content to the system 10.

Figure 5:
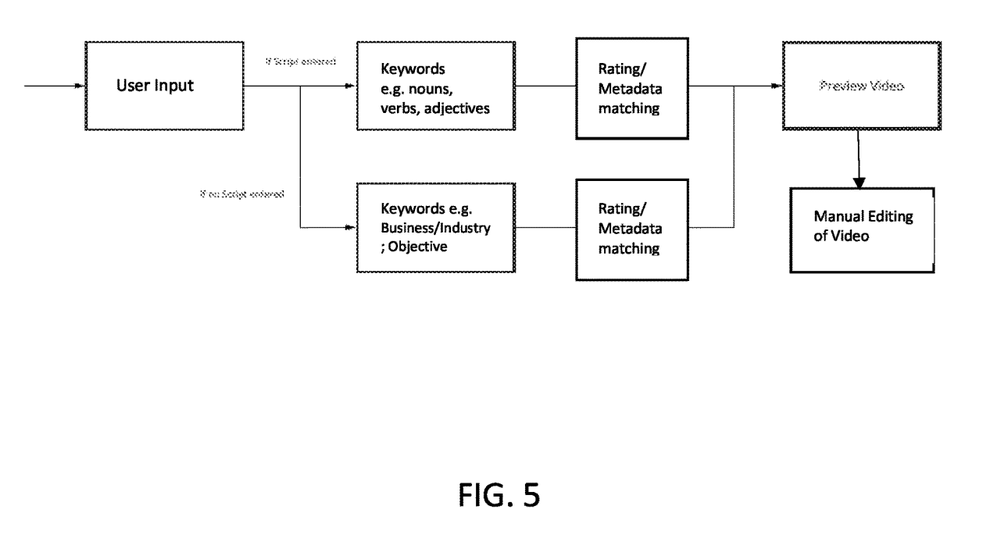
FIG. 5 shows the steps of processing the user's inputted instructions.

The system 10 may then automatically identify one or more keywords associated with the text instructions inputted by the user. As shown in FIG. 5, for example, if the inputted instruction comprises a script, the script may then be split into separate sentences and each sentence is then analyzed for keywords such as one or more nouns, verbs and/or adjectives. For example, if the script reads "Our company aims to help you with your marketing needs", the keywords such as the nouns of "company" and/or "needs", the verbs such as "aims" and/or "help", and/or the adjective of "marketing" may be identified. In one embodiment, the analyzed keywords may form a basis for a further search for a related, extended set of words to refine the search terms, such as, for example, the noun "company" can be extended into a subset of relevant words of "organization, team, people, office", etc. The analyzed keywords and/or the relevant subset of words extended from the keywords would then be matched with the metadata 32 at the image database 30 for any related images and/or video clips stored therein. In one embodiment, for example, the step may further comprise rating or grading of the matched images and/or video clips based on a degree of matching of the keywords and/or the relevant subset of words with the metadata 32 after the matching step. A number of matched images and/or video clips may then be selected based on their ratings, and subsequently, retrieved from the database for joining to form a contextually coherent video, as shown in FIG. 4.

Additionally or alternatively, especially when the inputted user's instruction does not comprise a script, the matching steps for images and/or video clips can be conducted based merely on keywords associated with or related to the types of business and/or industry, and/or objectives of the end video as indicated by the user's instructions and/or selections, as shown in FIG. 5. In one embodiment, the keywords in relation to the types of business and/or industry, and/or objectives of the end video can be selected from one or more drop-down menu from the user interface of the system 10. For example, if the user has inputted or selected "marketing" for the business and/or industry type and "promote my services" as the objective of the end video, a subset of relevant words for each of the two inputs will then be generated automatically by the system 10. For example, the subset of words of "promotion, branding, social media, sales, digital, SEO, business" can be generated for the business type of "marketing", and the subset of words of "social media, marketing, digital, consulting, partnership, SEO" can be generated for the objective of "promote my services". The system 10 will then compare the two subsets of words to identify any overlapping concepts such as, in this case, "social media, digital, and SEO". These overlapped concepts will then be used for matching with the metadata 32 at the image database 30 for related images and/or video clips. Additional words of concept may also be included to the system based on the user's manual input, and/or by the system-derived "learning" based on the user's preference. Similarly, the matched images and/or clips can be rated based on a degree of matching of the concept words with the metadata 32 after the matching step. The matched images and/or clips may then be selected based on their corresponding ratings and be retrieved for joining to form a contextual coherent video.

In one further embodiment, the joined video may further be reviewed, edited and/or modified by the user. For example, the joined video can be manually edited or customized by including and/or removing of one or more images or clips from the video after the joining step. The user-customized, contextual coherent video which are generated based on the user's instructions would then be stored in the image database 30, such as a video database, in association with the inputted one or more instructions. The stored videos may further be analyzed based on a machine learning algorithm.

Optionally, the keywords as identified from the user's inputted instruction may further be used for matching with a set of stored video narratives for the purpose of identifying the matched narratives in association with the formed video. For example, the identified narratives can be presented at or with the formed video to allow the video to be become more descriptive of its purposes. The identified narratives may further be edited, modified or rewritten at the user's preference, e.g. by manually including and/or removing one or more words, phrases or sentences from the narratives to further personalize the formed video. Any personalization by the users such as by editing the formed videos and/or the narratives of the videos will also be recorded for the purpose of learning and analysis by the machine learning algorithm. In yet another aspect of the present invention, it is provided a non-transistory computer readable medium storing machine-readable instructions which, when implemented on a processor, implements the steps of the method as described above.

In one further aspect of the present invention, it is provided a system comprising a memory for storing data and a processor for executing computer readable instructions, wherein the processor is configured by the computer readable instructions when being executed to implement the method as described above.

One technical problem addressed by the present invention is how to automatically select from a library or database of stored images, particularly short video clips, a small number of images or video clips (when compared to the huge number of images or video clips stored in the library or database) which have a same or similar context or contexts such that said small selection of video clips can be joined together in a manner which results in a contextually coherent sequence of images or video. The problem is solved by automatically analysing each video clip on a frame by frame basis using a content analysis engine to identify objects in said video clip. The video clip is further analysed by a contextual analysis engine to identify contextual relationships between said identified objects, but to also identify a background or landscape of the video clip in order to identify contextual relationships between the identified objects and said background or landscapes. The video clips are stored with metadata describing said contextual relationships. On receipt of a user input, the stored metadata enables a small number of video clips which can be considered to be contextually coherent to be automatically selected and automatically joined to form a contextually coherent video for the user. The system therefore provides a means of automatically analyzing video clips from various sources, storing said video clips for automatic retrieval based on metadata describing contexts of said video clips and matching selected video clips on a contextually coherent basis.

The video clips stored in the database of the system of the invention can be obtained from various sources such as content providers. The video clips can be stored with the content provider information such that, when a video clip from a content provider is utilized in making a contextually coherent video for a user, the content provider may receive a fee for use of their video clip.

The present invention is advantageous in that it provides an AI-based, computer implemented system and method for automatically and systematically analyzing contexts of an image and/or a video. By identifying both the content and the context of one or more images and/or videos, the system automatically develops a library or database with context-associated metadata. Based on the built metadata and one or more user's inputted instructions, the system is capable of automatically generating a contextually coherent video with a reasonable level of accuracy and relevance. The present invention further provides an effective method of analyzing images and/or videos for contextual content in a computationally efficient manner. The method involves one or more steps which prevent or reduce the unnecessary processing of steps and data. For example, analysis of a large number of images and/or videos can be processed in forming a contextual coherent video in seconds. In addition, a multiple number of images or videos can also be processed and analyzed simultaneously.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer-implemented method of processing an image, the method comprising the steps of:
    identifying objects in the image using a content analysis engine;
    based on information from a relationship database, using a contextual analysis engine to automatically:
        identify contextual relationships between some or all of the identified objects in the image,
        derive a background or landscape of said image from one or more of said identified objects; and subsequently, and
        analyse the identified contextual relationships between the identified objects and the derived background or landscape to thereby associate one or more contexts with said image;
    wherein the objects identified by the content analysis engine comprise primary objects provided at a first visual layer having a first distance from an image viewpoint; and the background or landscape derived by the context analysis engine comprises other, secondary objects provided at a second visual layer having a second distance from the view-point.

2. The computer-implemented method according to claim 1, further comprising the step of storing said image in an image database in association with metadata describing said contexts.

3. The computer-implemented method according to claim 2, further comprising the step of tagging said stored image with context tags, and storing said image with the context tags as part of the metadata.

4. The computer-implemented method according to claim 2, further comprising the step of comparing the associated metadata describing said contexts of an image stored in the image database with manually inputted metadata describing said image; and modifying the associated metadata based on a difference identified by the comparing step.

5. The computer-implemented method according to claim 1, wherein the step of identifying objects in the image using a content analysis engine comprises analysing one or more characteristics of the objects to thereby identify content of the objects in the image.

6. The computer-implemented method according to claim 1, wherein the second distance is further than the first distance relative to the view-point.

7. The computer-implemented method according to claim 1, wherein the information from the relationship database is provided via manual input and/or generated automatically by a machine learning algorithm.

8. The computer-implemented method according to claim 1, further comprising the step of recognising one or more texts in the image and, based on the information from the relationship database, using the contextual analysis engine to automatically identify contextual relationships between some or all of the identified objects and the recognized texts in the image.

9. The computer-implemented method according to claim 1, further comprising a step of storing the identified contextual relationships of the identified objects in the image in the relationship database to form part of the information.

10. A computer-implemented method for generating a contextually coherent image sequence based on a plurality of images processed by the method of claim 1, comprising the steps of:
- inputting one or more instructions;
- identifying one or more keywords associated with the inputted instructions;
- matching the keywords with metadata stored in association with images in an image database;
- retrieving a plurality of matched images based on the matching step; and
- joining the plurality of matched images to form a contextually coherent image sequence.

11. The computer-implemented method according to claim 10, further comprising the step of rating the plurality of matched images based on a degree of matching of the keywords with the metadata; and selecting the plurality of matched images based on the rating prior to the retrieving step.

12. The computer-implemented method according to claim 10, further comprising the step of modifying the joined image sequence by manually including and/or removing one or more images from the image sequence after the joining step.

13. The computer-implemented method according to claim 12, further comprising the step of storing the formed contextually coherent image sequence and/or the modified image sequence in an image sequence database in association with the inputted one or more instructions.

14. The computer-implemented method according to claim 13, further comprising the step of analysing the stored image sequence in the image sequence database via a machine learning algorithm.

15. The computer-implemented method according to claim 10, further comprising, after the identifying step, the steps of matching the keywords with a set of stored narratives and identifying the matched narratives.

16. The computer-implemented method according to claim 15, further comprising, after the joining step to form the contextual coherent image sequence, the step of presenting the identified narratives at or with the formed video.

17. The computer-implemented method according to claim 16, further comprising the step of modifying the presented narratives by manually including and/or removing one or more words from the narratives.

18. A system comprising a memory for storing data and a processor for executing computer readable instructions, wherein the processor is configured by the computer readable instructions when being executed to implement the method of claim 1 or claim 10.

\* \* \* \* \*